(12) United States Patent
Obrejanu

(10) Patent No.: US 7,883,570 B2
(45) Date of Patent: Feb. 8, 2011

(54) SPIRAL GAS SEPARATOR

(75) Inventor: Marcel Obrejanu, Calgary (CA)

(73) Assignee: Star Oil Tools Inc., Calgary, Alberto (CA)

( * ) Notice: Subject to any disclaimer, the term of this patent is extended or adjusted under 35 U.S.C. 154(b) by 631 days.

(21) Appl. No.: 11/906,310

(22) Filed: Oct. 1, 2007

(65) Prior Publication Data

US 2009/0084263 A1 Apr. 2, 2009

(51) Int. Cl.
*B01D 45/14* (2006.01)
*B01D 19/00* (2006.01)

(52) U.S. Cl. ............................. 95/261; 95/269; 96/208; 96/211; 96/212; 96/216; 55/414; 55/456; 166/105.5

(58) Field of Classification Search ................. 55/318, 55/447, 456, 462, 414; 95/241, 261, 262, 95/267, 269; 96/155, 204, 206, 207, 208, 96/209, 211, 212, 216, 217, 220; 166/105, 166/105.3, 105.4, 105.5
See application file for complete search history.

(56) References Cited

U.S. PATENT DOCUMENTS

| | | | |
|---|---|---|---|
| 2,446,882 A | 8/1948 | Morrison | |
| 2,674,192 A | 4/1954 | Coberly | |
| 2,970,669 A | 2/1961 | Bergson | |
| 3,128,719 A | 4/1964 | Jongbloed et al. | |
| 3,204,696 A | 9/1965 | Priester et al. | |
| 3,887,342 A * | 6/1975 | Bunnelle | 96/214 |
| 3,972,352 A | 8/1976 | Bunnelle | |
| 4,088,459 A * | 5/1978 | Tuzson | 96/207 |
| 4,231,767 A * | 11/1980 | Acker | 96/174 |
| 4,272,258 A | 6/1981 | Shifflett | |
| RE30,836 E * | 12/1981 | Bunnelle | 96/214 |
| 4,376,676 A | 3/1983 | Gill | |
| 4,481,020 A * | 11/1984 | Lee et al. | 96/214 |
| 4,531,584 A | 7/1985 | Ward | |
| 4,747,697 A * | 5/1988 | Kojima | 366/339 |
| 4,808,007 A * | 2/1989 | King | 366/337 |

(Continued)

FOREIGN PATENT DOCUMENTS

CA     1183784     3/1985

(Continued)

*Primary Examiner*—Duane Smith
*Assistant Examiner*—Sonji Turner
(74) *Attorney, Agent, or Firm*—Cohen Pontani Lieberman & Pavane LLP

(57) ABSTRACT

An apparatus and method for separating components of a fluid containing liquid and gas comprises a housing having at least one elongate channel. Each channel has an inlet end, an outlet end and rounded walls enabling the fluid flowing through the channel to flow substantially free of turbulent flow. Each channel defines a spiral path through the housing and acts to separate the fluid flowing through the channel into a gas-depleted outer portion and a liquid-depleted inner portion. The apparatus includes a liquid outlet port for the gas-depleted outer portion and a gas outlet port for the liquid-depleted inner portion. The housing may include a mixing chamber in fluid communication with the inlet end of the channel. The mixing chamber may include a surface the fluid impacts against. The apparatus may include a chamber at the outlet end of the channel. The chamber may have a gas outlet port closer to the outlet end of the channel than the liquid outlet port.

22 Claims, 4 Drawing Sheets

U.S. PATENT DOCUMENTS

| | | | |
|---|---|---|---|
| 4,913,630 A * | 4/1990 | Cotherman et al. | 417/313 |
| 5,104,233 A * | 4/1992 | Kojima | 366/339 |
| 5,338,341 A | 8/1994 | Mazzei et al. | |
| 5,431,228 A | 7/1995 | Weingarten et al. | |
| 5,482,117 A | 1/1996 | Kolpak et al. | |
| 5,516,360 A * | 5/1996 | Normandeau et al. | 96/207 |
| 5,525,146 A * | 6/1996 | Straub | 96/214 |
| 5,531,811 A | 7/1996 | Kloberdanz | |
| 5,570,744 A | 11/1996 | Weingarten et al. | |
| 5,698,014 A | 12/1997 | Cadle et al. | |
| 5,902,378 A * | 5/1999 | Obrejanu | 95/248 |
| 6,113,675 A * | 9/2000 | Branstetter | 95/261 |
| 6,155,345 A | 12/2000 | Lee et al. | |
| 6,257,333 B1 | 7/2001 | Mann et al. | |
| 6,394,182 B1 | 5/2002 | Fadel | |
| 6,564,865 B1 * | 5/2003 | Brady et al. | 166/105.3 |
| 6,705,402 B2 * | 3/2004 | Proctor | 166/369 |
| 6,723,158 B2 * | 4/2004 | Brown et al. | 96/214 |
| 6,755,250 B2 | 6/2004 | Hall et al. | |
| 6,860,921 B2 * | 3/2005 | Hopper | 95/261 |
| 7,461,692 B1 * | 12/2008 | Wang | 95/261 |
| 2002/0174982 A1 | 11/2002 | Weingarten | |
| 2002/0194988 A1 | 12/2002 | Betting et al. | |
| 2003/0111230 A1 * | 6/2003 | Olson et al. | 166/369 |
| 2003/0145724 A1 | 8/2003 | Betting et al. | |
| 2009/0139938 A1 * | 6/2009 | Larnholm et al. | 210/788 |

FOREIGN PATENT DOCUMENTS

| | | |
|---|---|---|
| CA | 2027432 | 7/1991 |
| CA | 2099099 | 4/1997 |
| CA | 2291366 | 7/2000 |
| CA | 2155131 | 6/2001 |
| CA | 2207770 | 11/2001 |
| CA | 2497929 | 3/2004 |
| CA | 2510497 | 11/2005 |
| CA | 2425843 | 4/2007 |
| DE | 32 28 038 A1 | 2/1984 |
| GB | 2124929 A * | 2/1984 |

* cited by examiner

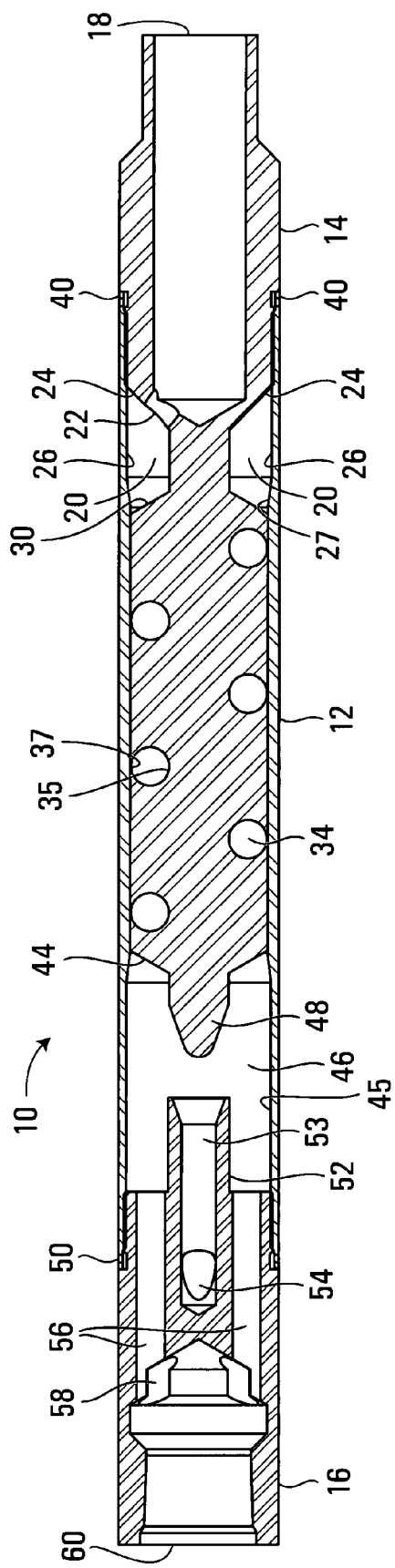
FIG. 3
FIG. 5
FIG. 4

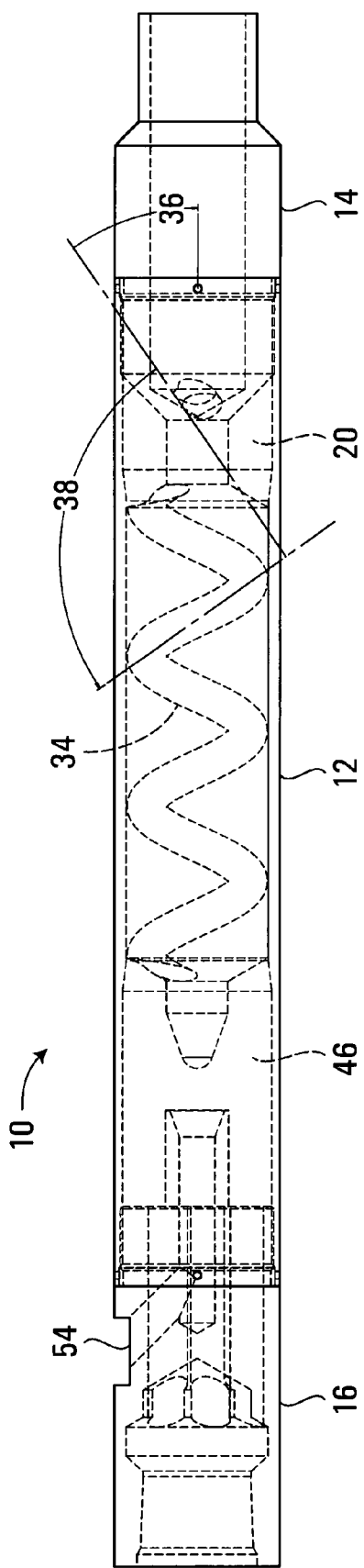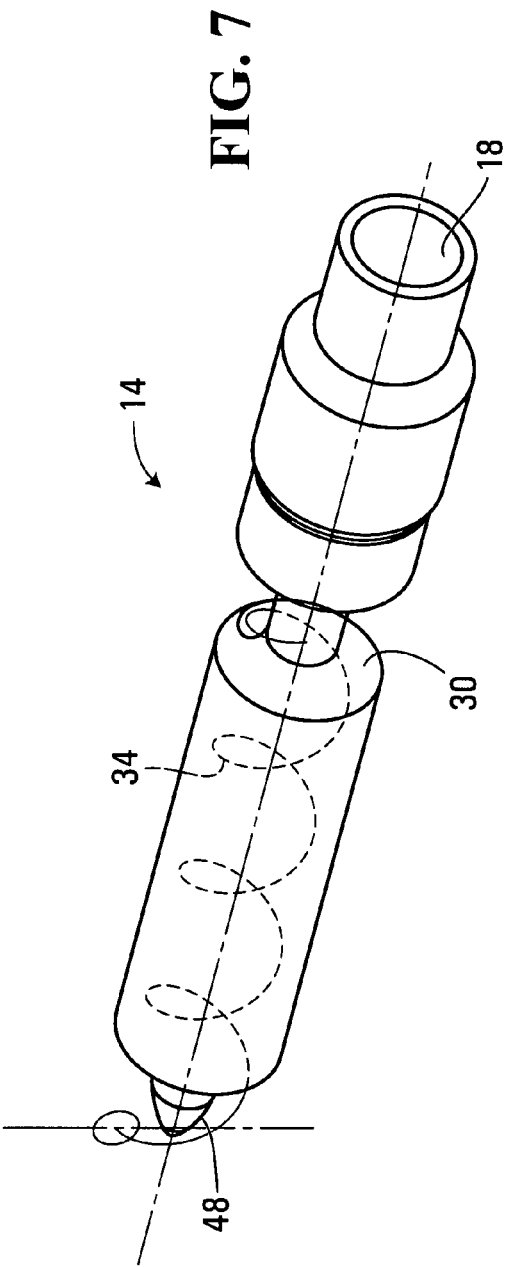

SPIRAL GAS SEPARATOR

FIELD OF THE INVENTION

This invention relates to an arrangement for separating gas from liquids. In particular, though not exclusively, the invention relates to a gas separator intended for use in separating gas from oil in a downhole formation.

BACKGROUND OF THE INVENTION

The terms "sub-surface formation" and "downhole formation" typically refer to the rock formation around a bore which has been drilled into the ground. The borehole provides a path for hydrocarbons, such as oil and gas, in the rock formation to be brought to the surface. Sub-surface formations from which hydrocarbons are produced, typically contain a fluid which includes liquid and gas mixed together. The liquid from the downhole formation will normally require pumping to bring it from the downhole formation to the surface. Pumps used for pumping the fluid from the downhole formation to the surface, such as progressing cavity pumps, piston pumps or electric submersible pumps, operate more efficiently if there is no gas in the fluid being pumped. Also, the presence of gas in the fluid being pumped can damage the pump, through heat generation, cavitation or gas absorption.

There are various devices known for separating gas from liquid in a downhole application. See, for example, U.S. Pat. No. 5,902,378 to Obrejanu, incorporated herein by reference in its entirety.

Typically, the more gas which can be eliminated from the fluid, the better the operation of the pump.

SUMMARY OF THE INVENTION

In a broad aspect, the invention provides an apparatus for separating components of a fluid containing liquid and gas, the apparatus comprising: a housing comprising therein at least one elongate channel; the at least one elongate channel comprising an inlet end, an outlet end and rounded walls enabling the fluid flowing through the channel to flow substantially free of turbulent flow; the at least one elongate channel defining a spiral path through the housing and acting to separate the fluid flowing through the channel into a gas-depleted outer portion and a liquid-depleted inner portion; and a liquid outlet port for the gas-depleted outer portion and a gas outlet port for the liquid-depleted inner portion.

In some embodiments, the at least one channel has a substantially round cross-section.

In some embodiments, the at least one channel comprises two channels.

In some embodiments, the at least one channel has a length that is approximately $3 \times \Pi$ times the mean diameter of the spiral passage.

In some embodiments, the housing further comprises a mixing chamber in fluid communication with the inlet end of the channel.

In some embodiments, the mixing chamber has a chamber inlet directed toward an impact surface to facilitate breaking up of clumps and further mixing of the fluid.

In some embodiments, the direction of the chamber inlet is not aligned with the inlet end of the channel.

In some embodiments, the direction of the chamber inlet is angled at approximately 90° to a direction of the channel at the inlet end.

In some embodiments, the chamber inlet is in an axial end of the housing.

In some embodiments, the apparatus further comprises a chamber at the outlet end of the channel, the chamber comprising the liquid and gas outlet ports and configured to direct the gas-depleted outer portion to the liquid outlet port and the liquid-depleted inner portion to the gas outlet port; wherein the chamber further comprises a guide member extending into the chamber adjacent to the outlet end of the at least one channel to direct the liquid depleted inner portion to the gas outlet port; and wherein the gas outlet port is closer to the guide member than the liquid outlet port.

In some embodiments, the gas outlet port comprises a tube projecting into the chamber and axially aligned with a free end of the guide member.

In some embodiments, the gas outlet port is spaced approximately 1 inch from the free end of the guide member.

In another broad aspect, the invention provides a method for separation of components of a mixture containing liquid and gas, the method comprising: drawing a flow of the mixture into a separator; advancing the flow in the separator in a rounded wall spiral path with sufficient angular momentum to effect ordering of the flow and at least partial separation of the flow into an inner liquid-depleted gaseous portion and a outer gas-depleted liquid portion; directing the inner liquid-depleted gaseous portion to a gas outlet port; and directing the outer gas-depleted liquid portion to a liquid outlet port.

In some embodiments, the drawing of the flow of the mixture into the separator includes directing the flow against an impact surface for breaking clumps and further mixing the mixture.

In some embodiments, the method further comprises passing the mixture from the spiral path into a chamber and drawing off the inner liquid-depleted gaseous portion before drawing off the outer gas-depleted liquid portion; passing the mixture from the spiral path into an exhaust chamber at reduced turbulence to maintain the separation of the portions; and drawing off the liquid portion.

In another broad aspect, the invention provides an apparatus for separating components of a fluid containing liquid and gas, the apparatus comprising: a housing comprising therein at least one elongate channel; the at least one elongate channel comprising an inlet end, an outlet end; a mixing chamber in fluid communication with the inlet end of the channel, the mixing chamber having a chamber inlet directed toward a impact surface to facilitate breaking up of clumps and further mixing of the fluid; the at least one elongate channel defining a spiral path through the housing and acting to separate the fluid flowing through the channel into a gas-depleted outer portion and a liquid-depleted inner portion; and a liquid outlet port for the gas-depleted outer portion and a gas outlet port for the liquid-depleted inner portion.

In another broad aspect, the invention provides an apparatus for separating components of a fluid containing liquid and gas, the apparatus comprising: a housing comprising therein at least one elongate channel; the at least one elongate channel comprising an inlet end, an outlet end; the at least one elongate channel defining a spiral path through the housing and acting to separate the fluid flowing through the channel into a gas-depleted outer portion and a liquid-depleted inner portion; a chamber at the outlet end of the channel, the chamber comprising a liquid outlet port for the gas-depleted outer portion and a gas outlet port for the liquid-depleted inner portion; the chamber further comprises a guide member extending into the chamber adjacent to the outlet end of the at least one channel to direct the liquid depleted inner portion to the gas outlet port wherein the gas outlet port is closer to the channel outlet end than the liquid outlet port.

In some embodiments, the guide member is cone shaped.

BREIF DESCRIPTION OF THE DRAWINGS

FIG. 3 is a sectional view of the gas separator of FIG. 1 taken along line AA with the main sub shown as sectioned;

FIG. 4 is a sectional view of the gas separator of FIG. 2 taken along line CC;

FIG. 5 is a sectional view of the gas separator of FIG. 2 taken along line DD;

FIG. 6 is a hidden line view of the gas separator of FIG. 1;

FIG. 7 is a perspective view of the main sub of the gas separator of FIG. 1 with a spiral passage depicted.

DETAILED DESCRIPTION OF THE PREFERRED EMBODIMENT

Figure 1:
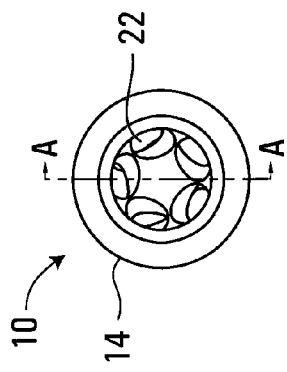
FIG. 1 is a downhole end view of a gas separator according to an embodiment of the invention.

A separator 10 is shown in FIGS. 1 to 5. The separator 10 includes a housing 12. A channel 34 extends through the housing 12. The channel 34 defines a spiral path through the housing which separates the fluid flowing through the channel into a gas-depleted outer portion and a liquid-depleted inner portion. The separator also includes a liquid outlet port for the gas-depleted outer portion and a gas outlet port for the liquid-depleted inner portion. The channel 34 may have rounded walls enabling the fluid flowing through the channel 34 to flow substantially free of turbulent flow. The separator may also include a mixing chamber 20 in fluid communication with the inlet end of the channel.

The separator 10 may also include a chamber 46 at the outlet end of the channel 34. The chamber 46 can include the liquid and gas outlet ports and a guide member for guiding the liquid-depleted inner portion. The gas outlet port can be closer to the guide member than the liquid outlet port.

Turning to the drawings in detail, the main components of the separator 10 in the embodiment of FIGS. 1 to 5 include the tubular housing 12, a main sub 14 and a top sub 16. These components will be described in turn from the normally downhole end upward.

The main sub 14 is depicted in cross-section in FIG. 3. The normally downhole end of the main sub 14 has a separator inlet 18. The separator inlet 18, in this example, is a tubular channel. In this embodiment, the separator inlet 18 is in an axial longitudinal end of the separator 10, rather than, for example, extending through the tubular sides of the main sub 14. The separator inlet 18 may define the bottom of a production string or other components may be attached below the separator inlet.

Next in line, in this example, from the downhole end of the main sub 14 is the mixing chamber 20. In this embodiment, the mixing chamber 20 is a ring shaped chamber formed between the housing 12 and a narrow portion of the main sub 14. The mixing chamber 20 has a tubular outside face 26 defined by an inside surface of the tubular housing 12. The mixing chamber also has axial end faces 24 and 30 which are angled towards the outside face 26.

Figure 2:
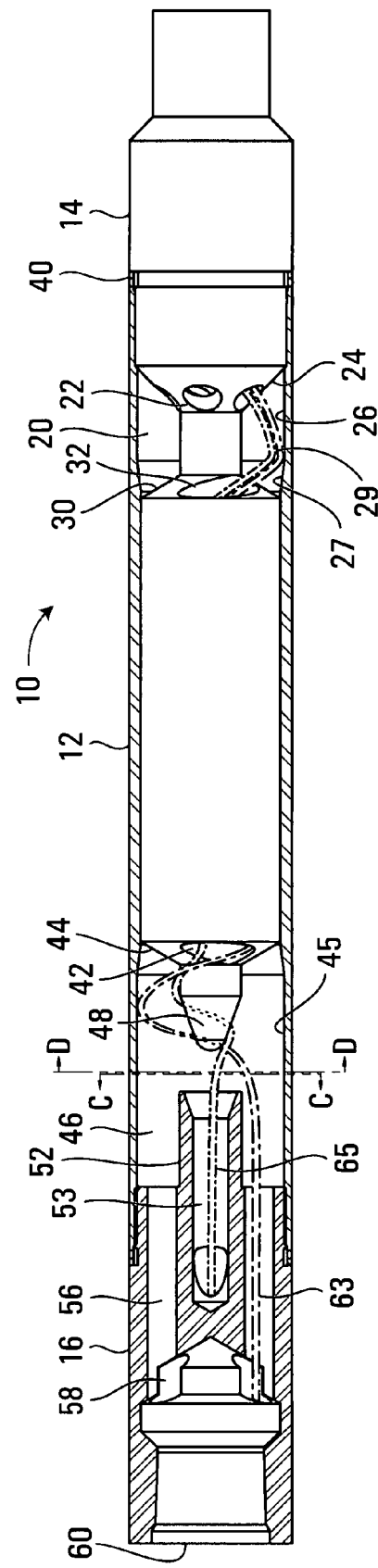
FIG. 2 is sectional view of the gas separator of FIG. 1 taken along line AA but with the main sub not shown as sectioned.

The separator inlet 18, is connected to the mixing chamber 20 through angled inlet ports 22. The inlet ports 22 connect to the mixing chamber 20 through the face 24. The face 24 is angled and the inlet ports are directed so that fluid exiting the inlet ports 22 is directed to impact the face 26 of the housing 12. This impact helps to break up clumps of heavy oil or solids and homogenize the mixture of phases before the separation process starts. In this embodiment, the inlet ports have a spiral direction which is counter to the spiral direction of the channels 34, also to increase mixing. The extreme turbulence induced by the continuous inflow of fluids through the inlet ports and the impact of the fluids with the inside of the housing 12 and the angled face 30, creates a shearing effect that helps free the gas trapped in the heavy oil clumps. An exemplary fluid path 29 is shown in FIG. 2. It will be appreciated that the specific angles shown in the figures are not essential. For example, the face 24 may be straight if the inlet ports 22 are directed towards the face 26. Any configuration which causes the fluid exiting the inlet ports 22 to impact against a surface may be used or the feature of using an impact surface may be eliminated.

Axially opposite the angled face 24 of the mixing chamber 20 is the face 30. In this embodiment, the face 30 is angled in the opposite direction to the face 24. The particular angle is not essential and may be eliminated. In this embodiment, the angle is such that fluid deflected by the face 26 is deflected by the face 26 towards the angled face 30.

The next component is the channel 34. As previously noted, the elongate channel 34 defines a spiral or helix passage through the separator 10. The passage is shown schematically in FIGS. 6 and 7. In the embodiments depicted in the figures, the spiral channel 34 is shown as having a circular cross-section. The circular cross-section enables a smooth flow pattern for fluid flowing through the channel 34. The cross-section, however, does not need to be circular. Any smooth wall shape without sharp corners, such as an oval or other shapes with smoothly rounded corners, may be used. This is in contrast to having passages defined by an auger in a housing as in U.S. Pat. No. 5,902,378 referenced above.

In this embodiment, the portion of the gas separator 10 through which the spiral channel 34 is defined is part of the main sub 14. The housing 12 extends over this portion of the main sub 14 and is connected to the main sub 14 at a connection 40. The connection 40 may, for example, be a threaded or a press-fit connection.

It will be appreciated that these elements may be formed in different ways. For example, the main sub 14 may be comprised of several different parts and the portion of the separator 10 through which the spiral channel 34 is defined may not have a surrounding housing 12. The spiral channel 34 may be machined through a single part as depicted in the figures or may, for example, be machined on the outside and inside of the axially mating parts which together define the channel 34.

Figure 8:
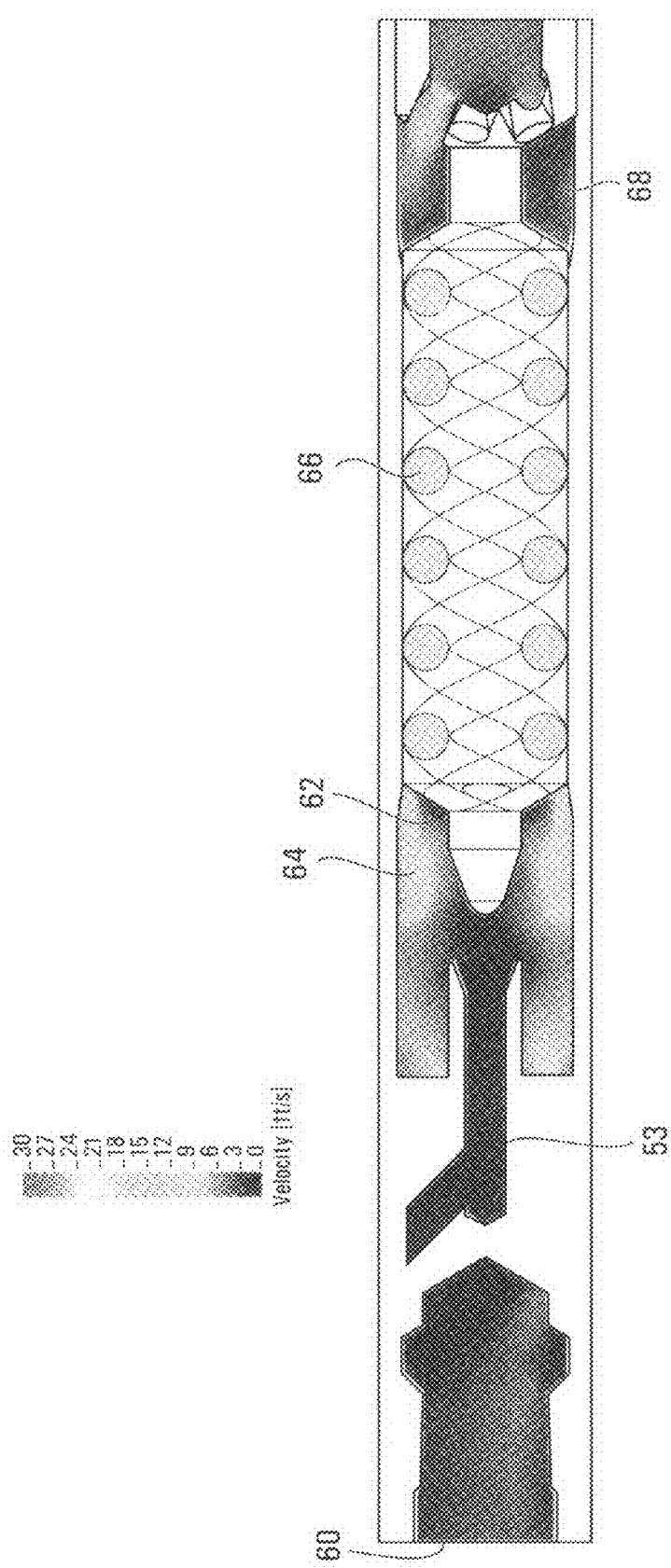
FIG. 8 is flow velocity profile for a second embodiment of the invention which has two spiral passages.

Inlets 32 to the spiral channels 34 are defined through the face 30. FIGS. 1 to 7 depict a single spiral channel 34. However, it will be appreciated that more than one spiral channel may be present. For example, FIG. 8 depicts two spiral channels.

The orientation of the components of the separator may be used to improve mixing. FIG. 6 shows an angle 36 between the longitudinal axis of the separator 10 and the direction of entry of the mixing chamber inlet ports 22 into the mixing chamber 20. In this embodiment, the angle 36 is 35 degrees. FIG. 6 further shows an angle 38 between the direction of the inlet ports 22 and the direction of the inlets 32 to the spiral channels 34. In this embodiment, an angle of 90 degrees is depicted. These angles are not essential. The differing directions of the inlet ports 22 and the inlets 32 allow for increased mixing in the mixing chamber 20. The face 26 may also have a shoulder 27 upon which fluid may impact.

Maximising the mixing or agitation is helpful to break up clumps of material. Breaking up the clumps of solid particles helps to prevent the solids from disturbing the organised flow through the spiral passages. Breaking up of clumps or droplets of very viscous heavy oil will cause the "trapped" or attached gas to be released and more easily separated from the liquid. Otherwise, the gas trapped by high surface tension of the very viscous heavy oil may be washed through, with the liquid phase, reducing the efficiency of the gas separation. The freeing of the gas is also enhanced by the change in the fluid flow velocity in going from the small inlet ports 22 to the larger mixing chamber 20, by change in direction as the fluid impacts the face 26, by the change in direction from oppositely angled inlet ports 22 to the inlets 32, and by the change in pressure in the larger volume of the mixing chamber 20 compared with the inlet ports 22. The mixing chamber transforms the natural influx of gas, liquids and solids into a homogenous mixture that will flow more easily through the spiral passages and will be more easily organised in separate layers by centrifugal forces. However, the mixing chamber may be eliminated.

In this embodiment, the main sub 14 terminates as a guide cone 48. The guide cone 48 is centered axially on the end of the main sub 14 opposite the inlet 18. The guide cone has initially straight sides which taper to a cone with a rounded end. Other embodiments which eliminate the cone or provide a cone or projection of other shapes may be utilised.

The exhaust chamber 46 is the next component following the channel 34. The exhaust chamber is defined by the main sub 14 on one end, the inside surface of the housing 12 defining an outside face 45, and the top sub 16 at the other end. The top sub 16 and the housing 12 are connected by a connection 50, for example, by a threaded connection or other manner. The guide cone 48 projects into the exhaust chamber 46. The top sub 16 includes a gas exhaust nipple 52.

The spiral channel 34 has an outlet 42 into the chamber 46. In this embodiment, the spiral channel 34 exits the main sub 14 through a face 44. In this embodiment the face 44 is angled toward an outside face 45 of the chamber 46. The face 44 need not be angled. For example, the face 44 may be perpendicular to the outside face 45 of the chamber 46. The angling of the face 44 helps to maintain the separation of the gas and liquid phases of a fluid exiting the spiral channel 34, by reducing the potential creation of turbulence in the liquid stream.

The face 44 in this embodiment is angled at 60 degrees to the face 30 but this relationship is not necessary.

The gas exhaust nipple 52 extends into the chamber 46 and is aligned with the guide cone 48. In this embodiment, the gas exhaust nipple 52 is cylindrical with a cylindrical channel 53 defined therethrough. The channel 53 has a flared entrance from the chamber 46. The spacing between the guide cone 48 and the gas exhaust nipple 52 is chosen to allow a maximum amount of gas to flow from the guide cone 48 into the gas exhaust nipple 52. In some embodiments, the inlet of the gas exhaust nipple 52 has a diameter of 1½ inches, the spacing between the gas exhaust nipple and the guide cone 48 is 1 inch and the main sub has a diameter of 5½ inches. The spacing between the guide cone and the exhaust gas nipple may also, for example, be between ½ inch and 1½ inches.

The channel 53 connects to a gas outlet 54. The gas outlet 54 provides an exit through a side of the separator 10 as best seen in FIG. 6.

Surrounding the gas exhaust nipple 52 are relatively large diameter liquid exhaust passages or channels 56. The liquid exhaust passages 56 may, for example, be a series of channels or a single channel. The liquid passage 56 terminates in liquid outlets 58 which connect to the main liquid outlet 60. The liquid can therefore exit the separator 10 in an axially longitudinal direction. In contrast to the gas, which exits from the side of the separator 10. FIG. 2 depicts an exemplary liquid path 63 and an exemplary gas path 65.

The positioning and shape of the nipple 52, the cone 48, the passages 56 and the other elements of the chamber 46 may be varied or eliminated within the scope of the invention. Other configurations of the invention may eliminate the chamber 46 and connect the channel 34 to the respective gas and liquid outlets.

In an exemplary use, the separator 10 is connected at the bottom of a downhole assembly with a pump, such as a progressing cavity pump, installed above the separator 10. The liquid outlet 60 is connected to the inlet of the pump. Suction is then applied by the pump. The suction pulls fluid from the downhole into the separator inlet 18. The fluid will contain gas, liquid and possibly solids. The suction further pulls the fluid through the mixing chamber inlet ports 22. The mixing chamber 20 also acts as an expansion chamber since it has a volume greater than that of the inlet ports 22. The direction of the mixing chamber inlet ports 22 causes the fluid to impact against the face 26 of the mixing chamber 20. The turbulence caused by the fluid flowing into the mixing chamber 20 and the impact of the fluid on the inside face 26 creates a shearing effect that causes clumps to be broken up and the fluid to be more homogeneously mixed. The suction then pulls the fluid through the inlets 32 into the spiral channel 34 (see the exemplary liquid path 29).

Centrifugal forces created by the spiral path cause the fluid to separate as it flows through the spiral channel 34. The gas will flow along an inside face 35 of the spiral channel 34 and the liquid, which is more dense than the gas, will flow along an outside face 37, thus creating a gas-depleted outer portion and a liquid-depleted inner portion. The smoothly curved walls of the spiral channel 34, means that the fluid flow is more organised. This minimises turbulence, which would cause re-mixing, and helps maximise the separation of the components of the fluid into the gas component and the liquid component.

The fluid then exits the spiral channel 34, at the outlet 42 into the exhaust chamber 46. The function of the exhaust chamber 46 is to maintain the separate flow of the liquid and gas phases until the gas phase is channelled into the gas exhaust port, before it has a chance to get mixed back into the liquid flow. The close (for example, 1 inch) spacing between the end of the cone and the gas exhaust nipple aids in channelling the gas phase. The positioning of the gas exhaust port or nipple 52 closer to the outlet 42 than the liquid exhaust channels 56 also helps maintain the separation. The gas follows the guide cone 48 and flows into the channel 53 of the gas nipple 52, into the gas outlet 54 and thus out through the side of the separator 10 (see the exemplary gas path 65). The liquid is pulled by the suction to flow along the sides 45 of the chamber 46 and out through the liquid exhaust passages 56 (see the exemplary liquid path 63), then through the liquid outlet ports 58 and finally through the outlet 60 and into the pump (not shown).

Turning to FIG. 8, FIG. 8 depicts a flow simulation which shows how the gas and liquid phases of the fluid are separated. The dark shaded gas portions 62 follows the guide cone 48 and exit through the channel 53 of the gas exhaust nipple 52 and the outlet port 54. The light shaded liquid portion 64 follows the outer surface of the chamber 46 and exits through the liquid outlet 60.

The profile of the fluid 66 through the spiral channel shows that in this embodiment, a homogenous mixture enters the spiral passages and is quickly accelerated (within the first turn, as seen in FIG. 8) to a maximum velocity. The length of the spiral passage is designed to allow enough time for the separation of the phases and for the layers of different densities to be organised, before exiting the spiral passages into the exhaust chamber. The length of the spiral passages may be approximately 3×π times the mean diameter of the spiral passage with the minimum length being about 2×π times the mean diameter of the spiral gas passage. FIG. 8 also shows the mixture 68 as mixed by the configuration of a mixing chamber.

In contrast to previous technologies, that used "open channels" defined, for example, by an auger in a tubular housing to guide the mixture through an elongated angular separation chamber, in an angular path, the present embodiment eliminates the turbulence caused by the sharp edges of such a flow channel. The turbulent flow through such open channels causes some of the free gas to be mixed back into the liquid flow, reducing the efficiency of the gas liquid separation. The flow of fluids through the smooth walled spiral passage of the present invention is less turbulent and will allow for a more organised flow pattern of the separated phases and ensures that the separated phases flow in distinct layers in a smooth pattern and will not be mixed again, thus increasing the separation efficiency.

The relative position of the gas and liquid outlets also can enable improved separation. The use of a separate mixing and/or expansion chamber can also improve separation.

Numerous modifications and variations of the present invention are possible in light of the above teachings. It is therefore to be understood that within the scope of the appended claims, the invention may be practised otherwise than as specifically described herein.

The invention claimed is:

1. An apparatus for separating components of a fluid containing liquid and gas, the apparatus comprising:
   a housing comprising therein at least one elongate channel;
   the at least one elongate channel comprising an inlet end, an outlet end and a cross-section of smoothly rounded walls and corners enabling the fluid flowing through the channel to flow substantially free of turbulent flow;
   the at least one elongate channel defining a spiral path through the housing and acting to separate the fluid flowing through the at least one elongate channel into a gas-depleted outer portion and a liquid-depleted inner portion; and
   a liquid outlet port for the gas-depleted outer portion and a gas outlet port for the liquid-depleted inner portion.

2. The apparatus of claim 1 wherein the cross-section of the at least one elongate channel is substantially circular.

3. The apparatus of claim 1 wherein the at least one elongate channel comprises two channels.

4. The apparatus of claim 1 wherein the at least one elongate channel has a length that is approximately 3 ×Π times the mean diameter of the spiral path.

5. The apparatus of claim 1 wherein the housing further comprises a mixing chamber in fluid communication with the inlet end of the at least one elongate channel.

6. The apparatus of claim 5 wherein the mixing chamber has a mixing chamber inlet directed toward an impact surface wherein fluid entering the mixing chamber is directed to impact on the impact surface to facilitate breaking up of clumps and further mixing of the fluid.

7. The apparatus of claim 6 wherein the direction of the mixing chamber inlet is not aligned with the inlet end of the at least one elongate channel.

8. The apparatus of claim 7 wherein the direction of the mixing chamber inlet is angled at approximately 90° to a direction of the at least one elongate channel at the inlet end.

9. The apparatus of claim 6 wherein the mixing chamber inlet is in an axial end of the housing.

10. The apparatus of claim 1 further comprising an exhaust chamber at the outlet end of the at least one elongate channel, the exhaust chamber comprising the liquid and gas outlet ports and configured to direct the gas-depleted outer portion to the liquid outlet port and the liquid-depleted inner portion to the gas outlet port;
   wherein the exhaust chamber further comprises a guide member extending into the exhaust chamber from a direction of and adjacent to the outlet end of the at least one elongate channel, the guide member having an outer surface tapering to direct the liquid depleted inner portion to the gas outlet port; and
   wherein the gas outlet port is spaced from a free end of the guide member and is closer to the guide member than the liquid outlet port.

11. The apparatus of claim 10 wherein the gas outlet port comprises a tube projecting into the exhaust chamber and axially aligned with the free end of the guide member.

12. The apparatus of claim 11 wherein the gas outlet port is spaced approximately 1 inch from the free end of the guide member.

13. A method for separation of components of a mixture containing liquid and gas, the method comprising:
   drawing a flow of the mixture into a separator;
   advancing the flow in the separator in a spiral path, having a cross-section of smoothly rounded walls and corners, with sufficient angular momentum to effect ordering of the flow and at least partial separation of the flow into an inner liquid-depleted gaseous portion and a outer gas-depleted liquid portion;
   directing the inner liquid-depleted gaseous portion to a gas outlet port; and
   directing the outer gas-depleted liquid portion to a liquid outlet port.

14. The method of claim 13 wherein the drawing of the flow of the mixture into the separator includes directing the flow against an impact surface for breaking clumps and further mixing the mixture.

15. The method of claim 13 further comprising
   passing the inner liquid-depleted gaseous portion and the outer gas-depleted liquid portion from the spiral path into an exhaust chamber at reduced turbulence to maintain the separation of the portions; and
   drawing off the inner liquid-depleted gaseous portion before drawing off the outer gas-depleted liquid portion.

16. An apparatus for separating components of a fluid containing liquid and gas, the apparatus comprising:
   a housing comprising therein at least one elongate channel;
   the at least one elongate channel comprising an inlet end, an outlet end;
   a mixing chamber in fluid communication with the inlet end of the at least one elongate channel, the mixing chamber having a mixing chamber inlet directed toward an impact surface wherein fluid entering the mixing chamber is directed to impact on the impact surface to facilitate breaking up of clumps and further mixing of the fluid;
   the at least one elongate channel defining a spiral path through the housing and acting to separate the fluid flowing through the at least one elongate channel into a gas-depleted outer portion and a liquid-depleted inner portion; and a liquid outlet port for the gas-depleted outer portion and a gas outlet port for the liquid-depleted inner portion.

17. The apparatus of claim 16 wherein the direction of the mixing chamber inlet is not aligned with the inlet end of the at least one elongate channel.

18. The apparatus of claim 17 wherein the direction of the mixing chamber inlet is angled at approximately 90° to a direction of the at least one elongate channel at the inlet end.

19. An apparatus for separating components of a fluid containing liquid and gas, the apparatus comprising:

a housing comprising therein at least one elongate channel;

the at least one elongate channel comprising an inlet end, an outlet end;

the at least one elongate channel defining a spiral path through the housing and acting to separate the fluid flowing through the at least one elongate channel into a gas-depleted outer portion and a liquid-depleted inner portion;

an exhaust chamber at the outlet end of the at least one elongate channel, the exhaust chamber comprising a liquid outlet port for the gas-depleted outer portion and a gas outlet port for the liquid-depleted inner portion;

the exhaust chamber further comprises a guide member extending into the exhaust chamber from a direction of and adjacent to the outlet end of the at least one elongate channe, the guide member having an outer surface tapering to direct the liquid depleted inner portion to the gas outlet port wherein the gas outlet port is spaced from a free end of the guide member and is closer to the at least one elongate channel outlet end than the liquid outlet port.

20. The apparatus of claim 19 wherein the gas outlet port comprises a tube projecting into the exhaust chamber and axially aligned with the free end of the guide member.

21. The apparatus of claim 19 wherein the gas outlet port is spaced approximately 1 inch from the free end of the guide member.

22. The apparatus of claim 19 wherein the guide member is cone shaped.

* * * * *